(12) United States Patent
Warwick et al.

(10) Patent No.: US 7,287,276 B2
(45) Date of Patent: Oct. 23, 2007

(54) COORDINATED NETWORK INITIATOR MANAGEMENT THAT AVOIDS SECURITY CONFLICTS

(75) Inventors: Alan M. Warwick, Bellevue, WA (US); Bernard D. Aboba, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 640 days.

(21) Appl. No.: 10/658,838

(22) Filed: Sep. 8, 2003

(65) Prior Publication Data

US 2005/0055572 A1 Mar. 10, 2005

(51) Int. Cl.
*G06F 15/16* (2006.01)
*G06F 17/00* (2006.01)
*G06F 9/00* (2006.01)

(52) U.S. Cl. .................... 726/14; 726/1; 726/2; 726/3; 713/151; 713/100

(58) Field of Classification Search ................ 713/151; 726/1, 2, 14
See application file for complete search history.

(56) References Cited

U.S. PATENT DOCUMENTS

| | | | |
|---|---|---|---|
| 6,816,917 B2* | 11/2004 | Dicorpo et al. ............. | 710/5 |
| 2003/0084135 A1* | 5/2003 | Narain ....................... | 709/223 |
| 2004/0139240 A1* | 7/2004 | DiCorpo et al. ............ | 710/3 |
| 2004/0141498 A1* | 7/2004 | Rangan et al. .............. | 370/380 |
| 2004/0148376 A1* | 7/2004 | Rangan et al. .............. | 709/223 |

FOREIGN PATENT DOCUMENTS

EP 1102154 5/2001

OTHER PUBLICATIONS

Meth, Kalman, "iSCSI Initiator Design and Implementation Experience" INET Online, Jan. 1, 2002, XP-002324419.
Design and Implementation of a Software Prototype for Storage Area Network Protocol Evaluation Ashish Palekar, Anshul Chadda, Narendran Ganapathy, Robert Russell Aug. 21-24, 2001 pp. 661-666.
Distributed-and-Split Data-Control Extension to SCSI for Scalable Storage Area Networks Y. Bishara, N. Birk 2002 IEEE.

* cited by examiner

*Primary Examiner*—Kambiz Zand
*Assistant Examiner*—Samson Lemma
(74) *Attorney, Agent, or Firm*—Workman Nydegger

(57) ABSTRACT

An abstraction module that facilitates security configuration amongst a number of initiators in a manner that there are no conflicts in the security information across all initiators. The abstraction module exposes a common interface that may be used to configure any of the initiators, receives through this common interface an indication that a selected one of the initiators is to be configured to communicate with a selected target device, and retrieves security information from a common database, the database including information that is relevant to configuring security for any of the plurality of initiators. The abstraction module identifies a security configuration for the selected initiator using the retrieved security information and, if the settings would not cause a conflict with any of the other of the initiators, uses the identified security configuration to configure the selected initiator.

29 Claims, 3 Drawing Sheets

COORDINATED NETWORK INITIATOR MANAGEMENT THAT AVOIDS SECURITY CONFLICTS

BACKGROUND OF THE INVENTION

1. The Field of the Invention

The present invention relates to network communication technology. More specifically, the present invention relates to mechanisms in which the security configuration for initiators responsible for communicating with networked target devices is closely coordinated so as to avoid security conflicts.

2. Background and Related Art

Computing technology has transformed the way we work and play. In a typical configuration, a computing system is coupled through a local bus to a variety of hardware devices for optimal operation. Such devices may include, for example, magnetic and/or optical disk drives, printers, fax machines, scanners, cameras, or the like. The computing system communicates with each of the connected hardware devices using a standard communication protocol that is recognized by the hardware device.

One commonly used communication protocol for communication between a computing system and its various connected hardware devices is a parallel interface standard called "Small Computer System Interface" ("SCSI" for short). SCSI allows for effective block transfer of data between a computing system and its various peripheral devices. However, SCSI does have certain limitations. In particular, data transfer using SCSI is relatively slow compared to other data transfer mechanisms. Furthermore, the cable length of the SCSI is relatively short compared to expansive networks. Accordingly, the hardware devices typically have to be close to the computing system if SCSI is employed in its purest form.

One improvement to SCSI is called "Internet SCSI" ("iSCSI" for short). iSCSI is a standard which allows standard SCSI commands and responses to be communicated over any IP-based network such as Ethernets and the Internet. The computing system includes an "initiator" (which may be hardware or software) which initiates communication with the target device using the iSCSI standard. Specifically, the SCSI message is fragmented if needed and then encapsulated with Internet Protocol (IP) headers, whereupon the properly fragmented and encapsulated SCSI message is sent over the IP network. The target device then extracts and executes the SCSI command, and then returns the response, if any, using the iSCSI standard over the IP-based network.

The iSCSI standard allows SCSI commands to be delivered over great lengths. Accordingly, target devices may be remotely located from its associated computing system or systems. Accordingly, target devices may be more easily shared, and need not clutter the local space occupied by the associated computing system. In addition, many typical IP-networks operate at high frequencies. iSCSI may even support Ethernets that operate in the Gigabit per second range. Accordingly, iSCSI allows more rapid data transfer even over greater distances than the simple use of SCSI typically allows.

However, transferring iSCSI commands over an IP-based network introduces greater security threats than does the simple use of SCSI over a local bus. For instance. The iSCSI communications may be intercepted, eavesdropped, or highjacked. Accordingly, for sensitive iSCSI communications, a security standard compatible with IP called IPSec is often used for authentication and/or encryption of the message.

However, IPSec has a number of security configuration options. For example, IPSec supports a variety of encryption algorithms, includes options regarding what part of the message is to be encrypted, and what type of authentication is to be employed. The initiator responsible for communicating with a target device must be properly configured with the appropriate IPSec security information in order for the communication to be secured as desired and interpretable by the target device. In computing systems that have multiple initiators, the initiators are typically configured without regarding for the security configuration of the other initiators in the computing system. Accordingly, sometimes conflicts arise between the security configurations of the initiators. These conflicts may prevent the initiators from functioning as intended, or even functioning at all. The risk of such conflicts may be especially great when the initiators are supplied by different venders.

Accordingly, what would be advantageous are mechanisms in which multiple initiators on a computing system may be properly configured with security information in a manner that the security information of one initiator does not conflict with the security information of any other initiator.

BRIEF SUMMARY OF THE INVENTION

The foregoing problems with the prior state of the art are overcome by the principles of the present invention, which is directed towards an abstraction module that facilitates security configuration amongst a number of initiators in a manner that there are no conflicts in the security information across all initiators. Each initiator may establish communications with one or more target hardware devices using a specific standard such as iSCSI that is recognized by the hardware device.

The abstraction module exposes a common interface that may be used to configure any of the initiators. The abstraction module receives through this common interface an indication that a selected one of the initiators is to be configured to communicate with a selected target device. The indication may be provided, for example, in response to an express request from an application or user to communicate with the selected target device. Alternatively, the indication may be provided in advance of any express application or user request to communicate with the selected target device. For example, the indication may be received upon initialization of the computer system. The target device may be, for example, magnetic and/or optical disk drives, printers, fax machines, scanners, cameras, or the like.

The abstraction module then retrieves security information from a common database that includes information that is relevant to configuring security for any of the plurality of initiators. The database may be, for example, a MICROSOFT® ACTIVE DIRECTORY® or an ISNS database. The security information may be, for example, IPSec security configuration settings.

The abstraction module then identifies a security configuration for the selected initiator using the retrieved security information. The identified security information may even be the same as the retrieved security information, without any manipulation whatsoever. If the abstraction module determines that the identified configuration settings would not cause a conflict with any of the other of the initiators, then the abstraction module configures the selected initiator using the identified security configuration. Accordingly, the selected initiator may be configured to communicate with the target hardware device without degrading the ability of other initiators to communicate.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
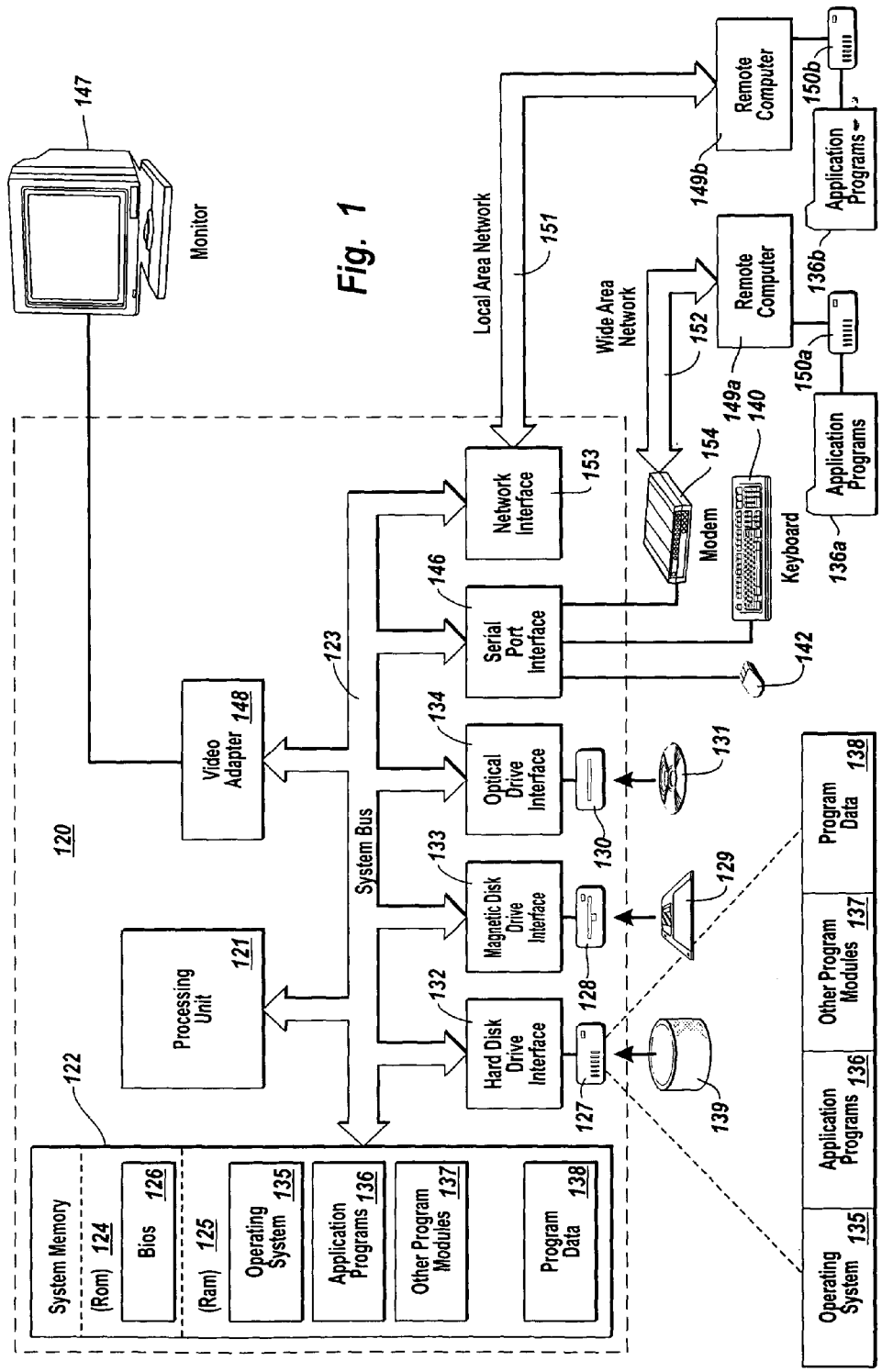
FIG. 1 illustrates a suitable computing system that may implement the features of the present invention.

The principles of the present invention relate to an abstraction module that facilitates security configuration amongst a number of initiators in a manner that there are no conflicts in the security information across all initiators. Each initiator establishes communications with one or more target hardware devices using a specific standard. The abstraction module exposes a common interface that may be used to configure any of the initiators.

The abstraction module receives through this common interface an indication that a selected one of the initiators is to be configured to communicate with a selected target device, and retrieves security information from a common database, the database including information that is relevant to configuring security for any of the plurality of initiators. The abstraction module identifies a security configuration for the selected initiator using the retrieved security information and, if the associated security settings would not cause a conflict with any of the other of the initiators, uses the identified security configuration to configure the selected initiator. Accordingly, the selected initiator may be configured to communicate with the target hardware device without degrading the ability of other initiators to communicate.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code. Although not required, the invention will be described in the general context of computer-executable instructions, such as program modules, being executed by computers in network environments. Generally, program modules include routines, programs, objects, components, data structures, etc. that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 1 illustrates suitable computing environment in which the principles of the present invention may be employed in the form of a computer 120. The computer 120 includes a processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 represents a suitable operating environment for the present invention, the principles of the present invention may be employed in any computing system that is capable of browsing to network sites. The computing system illustrated in FIG. 1 is illustrative only, and by no means represents even a small portion of the wide variety of environments in which the principles of the present invention may be implemented. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
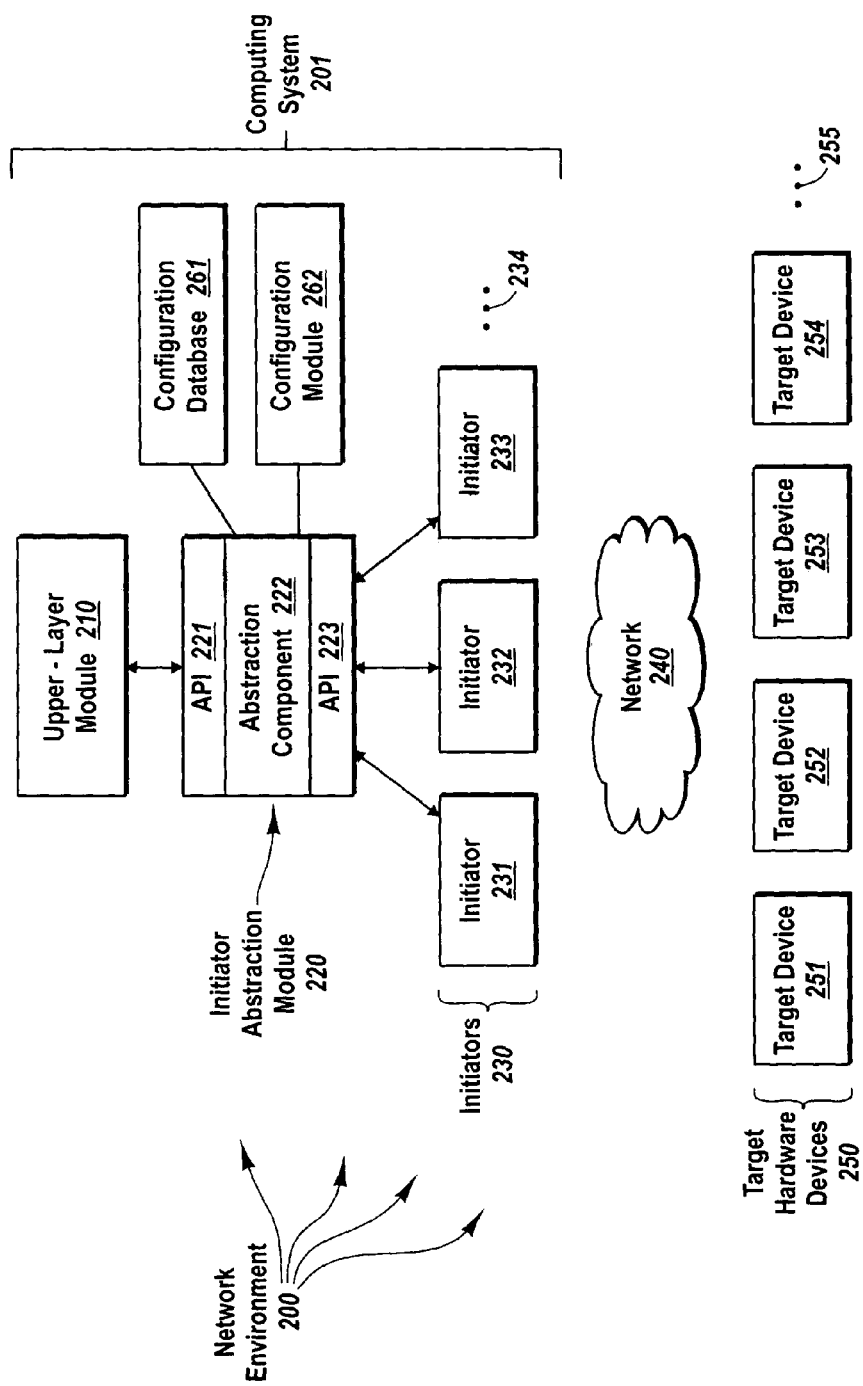
FIG. 2 illustrates a network environment in which an initiator abstraction module configures the security settings for each initiator in a manner that there are no conflicts between the security settings of each of the initiators.

FIG. 2 illustrates a network environment 200 in which the principles of the present invention may be employed. The network environment 200 includes a computing system 201 that may communicate over a network 240 with a number of different target hardware devices 250. The computing system 201 may be, for example, the computer 120 described above or any other computing system.

The target hardware devices 250 may include any hardware devices such as, for example, magnetic and/or optical disk drives, printers, fax machines, scanners, cameras, or the like. In the illustrated embodiment, the computing system may communicate with target hardware devices 251 through 254 among potentially others as represented by the horizontal ellipses 255. However, the computing system may be capable of communicating with other number of target hardware devices whether over a network or whether locally connected to the computing system.

One standard that may be used to communicate with target hardware devices is called Internet SCSI ("iSCSI" for short). As previously mentioned, iSCSI is a standard which allows standard SCSI commands and responses to be communicated over any IP-based network such as Ethernets and the Internet. SCSI is a parallel interface standard called "Small Computer System Interface" (SCSI for short). SCSI allows for effective block transfer between a computing system and its various peripheral devices. Whereas SCSI is used for effective block transfer of data to a computing system's peripheral devices, data transfer using SCSI is relatively slow. Furthermore, SCSI cables are limited in length. Accordingly, SCSI alone is typically used for very local peripheral devices. iSCSI, on the other hand, is much faster and allows the target hardware devices to be located anywhere on a network. However, iSCSI communications are much more susceptible to interception and other security risk inherent with communicating over a network.

The computing system 201 includes a number of initiators 231 through 233 among potentially other as represented by the horizontal ellipses 234, although the computing system 201 may also have fewer than three initiators. Each initiator may be a hardware component such as a plug-in board, or may be a software initiator that is instantiated in memory during runtime. Regardless, the initiator is configured to communicate with the target devices 250 over the network 240 in response to a request that requires the same from the upper-layer module 210. The initiators may be, for example, iSCSI initiators although that is not required.

The upper layer module 210 may be an application program such as, for example, one of application programs 136, or may be one of the other program modules 137. The upper layer module 210 may also present a single unified user interface for use regardless of the initiator to be used. There may also be multiple upper layer modules that may also cause any given initiator to communicate with a target device. The initiators 230 may each be, for example, one of the program modules 137. The network 240 may be any network whether spanning multiple computing systems, or whether internal to a single computing system. If the initiators are iSCSI initiators, the network may be, for example, an Internet Protocol (IP) based network including an Ethernet, a token ring network, the Internet, or the like.

As previously mentioned, each initiator 230 may have its own security configuration settings. For example, if the initiators 230 were iSCSI initiators, the security configuration settings could be, for example, IPSec configuration settings. The initiator abstraction module 220 intercedes between any upper layer module (such as upper-layer module 210) and the initiators 230, and forces consistency between any configuration settings of the various initiators 230. Accordingly, the initiators 230 retain their desired function since the initiator abstraction module 220 ensures no security setting conflicts.

The initiator abstraction module 220 includes an abstraction component 222 which contains the logic that enforces security configuration setting consistency amongst all of the initiators 230. The abstraction component 222 may communicate with the initiators 230 (and vice versa) via the API 223. The abstraction component 220 may communicate with upper-layer module 210 (and vice versa) via the API 221. Optionally, the abstraction component 220 may also cache the security information. This caching allows a hardware card that does not have non volatile memory to maintain the correct security configuration at each system power up. The caching also allows the card to be replaced with an identical card and not require the new card to be reprogrammed with the security information.

Each initiator 230 may register with the abstraction component 222 during installation and/or power-up or upon the occurrence of some other event. The registration may involve an identification of the initiator, as well as potentially notifications on the current security settings. In any case, the abstraction component 222 has a record of the initiator and may determine whether the initiator needs updated configuration information. The operation of the architecture of FIG. 2 and the remaining features of FIG. 2 will be described in further detail with respect to FIG. 3.

Figure 3:
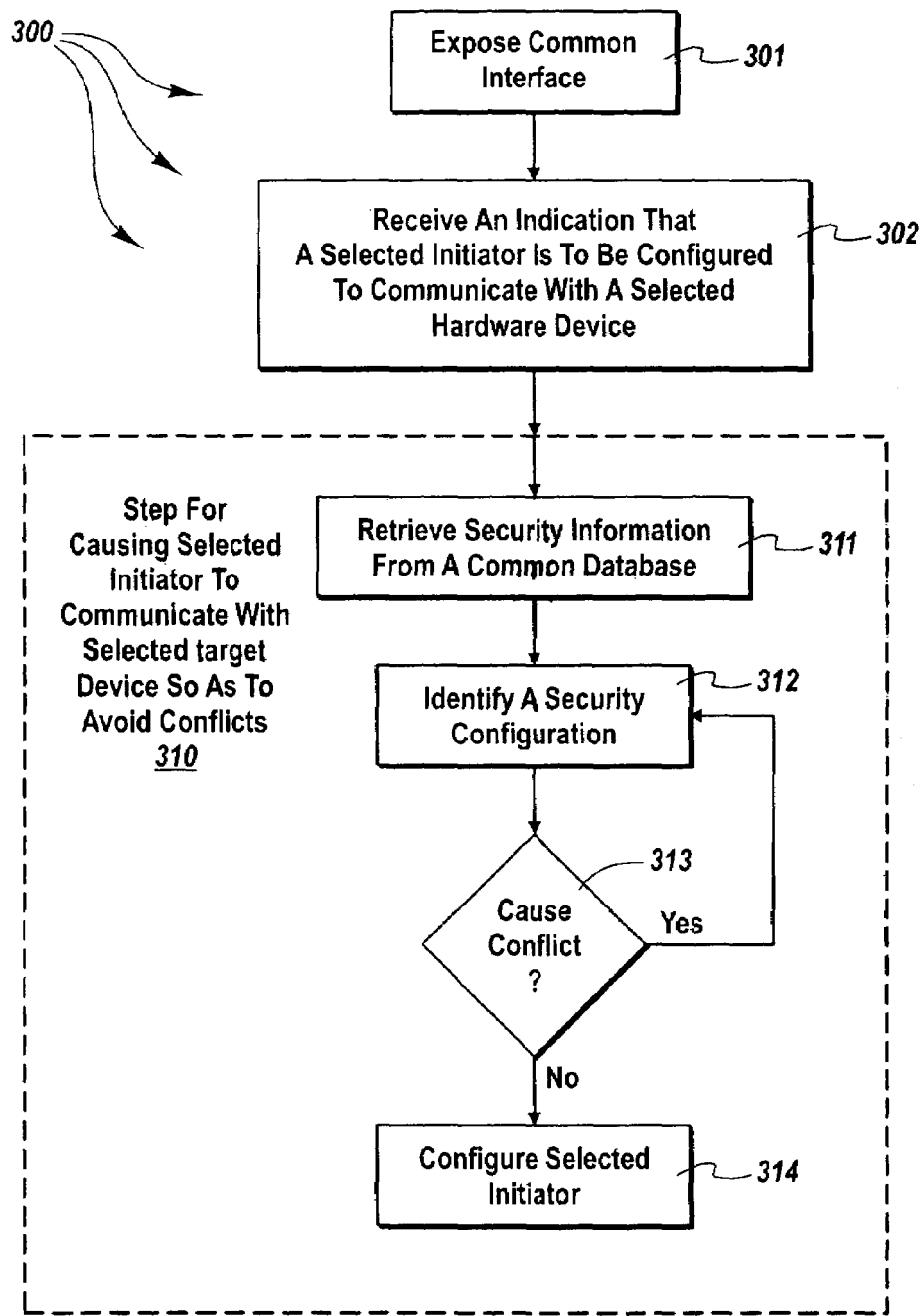
FIG. 3 illustrates a flowchart of method for the initiator abstraction module configuring the security settings for each initiator in accordance with the principles of the present invention.

FIG. 3 illustrates a flowchart of a method 300 for configuring the computer system to securely communicate with a target device over the network. The method 300 is performed by the abstraction component 222, which contains the logic that sets the security configuration settings (e.g., IPSec settings) for each of the initiators in a manner that security conflicts between the initiators is avoided.

The abstraction component 222 exposes a common interface that may be used to configure any of the plurality of initiators (act 301). This common interface is represented in FIG. 2 as Application Program Interface (API) 221.

At some point, the abstraction component 222 receives an indication through the common interface that a selected initiator from among the plurality of initiators is to be configured to communicate with a selected target device (act 302). The indication may also represent that multiple (or even all) of the initiators is to communicate with the selected target device. The indication itself may include security configuration (IPSec setting) information. The indication may identify the target hardware device in any manner that is recognized by the abstraction component 222. For example, if the initiators 230 were iSCSI initiators, the indication may identify the target hardware device using a portal or IP address of the target hardware device. The indication may be provided, for example, in response to an express request from an application or user to communicate with the selected target device. Alternatively, the indication may be provided in advance of any express application or user request to communicate with the selected target device. For example, the indication may be received upon initialization of the computer system.

In any case, the method 300 includes a functional, result-oriented step for causing the selected initiator to communicate with the selected target device such that the security configuration of the selected initiator does not conflict with others of the plurality of initiators (step 310). This functional, result-oriented step may include any corresponding acts for accomplishing the specified result. However, in the illustrated embodiment, the step 310 includes corresponding acts 311 through 314. Concurrently with setting configuration settings for one target device as specified in step 310, the abstraction component 222 may also set configuration settings for other target devices as well, especially if this is needed to ensure no conflicts between the initiators 230.

Specifically, the abstraction component 222 retrieves security information from a common directory that includes information that is relevant to security configuration settings for any of the initiators 230 (act 311). The database may be, for example, a distributed database such as MICROSOFT® ACTIVE DIRECTORY®, an Internet Storage Name Service (ISNS) database, or perhaps a local store such as a registry for example. The information contained in the database may include IPSec information, CHallenge Authentication Protocol (CHAP) or Certificate based authentication information. The distributed database may be shared by computing systems other than computing system 210 that have instances of the initiator abstraction module 220. The database may also be a locally persistent store in which information from the common database was previously cached for future configuration of the initiators 230. The database may also be a combination of the distributed database and the persistent store.

The initiator abstraction module 220 then identifies a security configuration for the selected initiator that is to be configured to communicate with the selected target hardware device. This security configuration may include the security information retrieved from the database with potentially some further processing performed by the abstraction component. In some cases, the initiators may have been preconfigured with information from the common database.

The initiator abstraction module 220 then determines that the identified security configuration would not cause the selected initiator to conflict with any of the other of the initiators (act 313). If a conflict does exist (Yes in act 313), then the abstraction component 222 does one or both of reconfiguring other initiators so that the conflict is eliminated or identifying another security configuration for the selected initiator. If a conflict does not exist (No in act 313), then the abstraction component 222 configures the selected initiator using the identified security configuration (act 314).

The configuration settings for IPSec security include whether or not to use a key, whether or not tunneling mode is desired, which encryption algorithm is to be used, and other known IPSec setting options. The abstraction component 222 may then give the proper security settings to the configuration module 262. For example, if the security information is IPSec settings for communication using iSCSI, the configuration module 262 may be the TCP/IP configuration module for a software initiator. When communicating, the software initiator may use the TCP/IP protocol stack offered by the operating system. If the initiator is a hardware initiator, the hardware initiator may include its own protocol stack (e.g., its own TCP/IP stack), and thus may configure its own memory in response to instructions from the initiator abstraction module 220. When communicating, the hardware initiator may use its own internal TCP/IP stack.

Accordingly, a mechanism has been described in which an initiator abstraction module 220 forces consistently in security settings between all initiators on a single computing system. Accordingly, no conflicts arise between initiators, while enabling secure and fast data transfer between target hardware devices configured on a network, and the computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computer system that includes a plurality of initiators, each for initiating communication with target devices over a network, a method for configuring the computer system to securely communicate with a target device over the network, the method comprising the following performed by an initiator abstraction module that configures each of the plurality of initiators in a manner that security conflicts between the plurality of initiators is avoided:

an act of exposing an abstraction component comprising logic that that may be used to configure any of the plurality of initiators, the abstraction component being a component of an initiator abstraction module configured to enforce consistent security configuration settings between initiators;

an act of receiving registration information on the occurrence of some event through the abstraction component that a selected initiator from among the plurality of initiators is to be configured to communicate with a selected target device;

an act of the abstraction component retrieving security information from a database that includes information that is relevant to configuring security for any of the plurality of initiators such that consistency between initiators' security configuration settings is ensured;

an act of identifying a security configuration of the selected initiator using the retrieved security information;

an act of determining that if the identified security configuration were applied to the selected initiator, the applied identified security configuration would not cause the selected initiator to conflict with any of the existing security configurations of the other of the plurality of initiators; and upon determining that the identified security configuration would not cause the selected initiator to conflict with any of the existing security configurations of the other of the plurality of initiators, an act of configuring the selected initiator using the identified security configuration.

2. A method in accordance with claim 1, wherein the identified security configuration is different than the retrieved security information.

3. A method in accordance with claim 1, wherein the identified security configuration is the same as the retrieved security information.

4. A method in accordance with claim 1, wherein the retrieved security information comprises IPSec configuration information.

5. A method in accordance with claim 1, wherein the retrieved security information comprising CHAP configuration information.

6. A method in accordance with claim 1, wherein the selected initiator is configured to cause communication to occur with the target device using iSCSI.

7. A method in accordance with claim 1, wherein the act of retrieving security information from a database comprises an act of retrieving the security information from an Active Directory.

8. A method in accordance with claim 1, wherein the selected initiator is a hardware initiator.

9. A method in accordance with claim 1, wherein the selected initiator is a software initiator.

10. A method in accordance with claim 1, wherein the act of retrieving security information occurs in response to the act of the abstraction module receiving the indication.

11. A method in accordance with claim 1, wherein the indication through the abstraction component is received in response to a request to communicate with the selected target device.

12. A method in accordance with claim 1, wherein the indication through the abstraction component is received in advance of any express request to communicate with the selected target device.

13. A method in accordance with claim 12, wherein the indication through the abstraction component is received in response to initializing the computer system.

14. In a computer system that includes a plurality of initiators, each for initiating communication with target devices over a network, a method for configuring the computer system to securely communicate with a target device over the network, the method comprising the following performed by an initiator abstraction module that configures each of the plurality of initiators in a manner that security conflicts between the plurality of initiators is avoided:

an act of exposing an abstraction component comprising logic that may be used to configure any of the plurality of initiators, the abstraction component being a component of an initiator abstraction module configured to enforce consistent security configuration settings between initiators;

an act of receiving registration information on the occurrence of some event through the abstraction component that a selected initiator from among the plurality of initiators is to be configured to communicate with a selected target device; and a step for causing the selected initiator to communicate with the selected target device using security settings that do not conflict with security configurations of others of the plurality of initiators such that the security configuration of the selected initiator is consistent with the security configurations of others of the plurality of initiators.

15. A method in accordance with claim 14, wherein the step for causing the selected initiator to communicate with the selected target device comprises the following:

an act of the abstraction component retrieving security information from a database that includes information that is relevant to configuring security for any of the plurality of initiators such that consistency between initiators' security configuration settings is ensured;

an act of identifying a security configuration of the selected initiator using the retrieved security information;

an act of determining that if the identified security configuration were applied to the selected initiator, the applied identified security configuration would not cause the selected initiator to conflict with any of the existing security configurations of the other of the plurality of initiators; and upon determining that the identified security configuration would not cause the selected initiator to conflict with any of the existing security configurations of the other of the plurality of initiators, an act of configuring the selected initiator using the identified security configuration.

16. A method in accordance with claim 15, wherein the identified security configuration is different than the retrieved security information.

17. A method in accordance with claim 15, wherein the identified security configuration is the same as the retrieved security information.

18. A method in accordance with claim 15, wherein the retrieved security information comprises IPSec configuration information.

19. A method in accordance with claim 15, wherein the retrieved security information comprising CHAP configuration information.

20. A method in accordance with claim 15, wherein the selected initiator is configured to cause communication to occur with the target device using iSCSI.

21. A method in accordance with claim 15, wherein the act of retrieving security information from a database comprises an act of retrieving the security information from an Active Directory.

22. A method in accordance with claim 15, wherein the selected initiator is a hardware initiator.

23. A method in accordance with claim 15, wherein the selected initiator is a software initiator.

24. A computer program product for use in a computer system that includes a plurality of initiators, each for initiating communication with target devices over a network, the computer program product for implementing a method for configuring the computer system to securely communicate with a target device over the network, the computer program product comprising one or more computer-readable media having thereon computer-executable instructions that, when executed by one or more processors of the computing system, cause the computing system to perform the following:

an act of instantiating an initiator abstraction module and causes the abstraction module to perform the following:

an act of exposing an abstraction component comprising logic that that may be used to configure any of the plurality of initiators, the abstraction component being a component of an initiator abstraction module configured to enforce consistent security configuration settings between initiators;

an act of receiving registration information on the occurrence of some event through the abstraction component that a selected initiator from among the plurality of initiators is to be configured to communicate with a selected target device;

an act of the abstraction component retrieving security information from a database that includes information that is relevant to configuring security for any of the plurality of initiators such that consistency between initiators' security configuration settings is ensured;

an act of identifying a security configuration of the selected initiator using the retrieved security information;

an act of determining that if the identified security configuration were applied to the selected initiator, the applied identified security configuration would not cause the selected initiator to conflict with any of the existing security configurations of the other of the plurality of initiators; and upon determining that the identified security configuration would not cause the selected initiator to conflict with any of the existing security configurations of the other of the plurality of initiators, an act of configuring the selected initiator using the identified security configuration.

25. A computer program product in accordance with claim 24, wherein the one or more computer-readable media are physical memory media.

26. A computer program product in accordance with claim 25, wherein the one or more computer-readable media is persistent memory.

27. A computer program product in accordance with claim 25, wherein the one or more computer-readable media is volatile system memory.

28. A computer program product in accordance with claim 24, wherein the retrieved security information comprises IPSec configuration information.

29. A computer program product in accordance with claim 24, wherein the retrieved security information comprising CHAP configuration information.

* * * * *